United States Patent Office 3,828,088
Patented Aug. 6, 1974

---

3,828,088
METHOD FOR THE PREPARATION OF 2-ACETAMIDOETHYL(4 - CHLOROPHENYL) - α - HALOACETATE
Richard F. Shuman, Westfield, N.J., assignor to Merck & Co., Inc., Rahway, N.J.
No Drawing. Filed July 13, 1972, Ser. No. 271,448
Int. Cl. C07c 119/20
U.S. Cl. 260—453 R                            9 Claims

ABSTRACT OF THE DISCLOSURE

A method for preparing the intermediate 2-acetamidoethyl 4-chlorophenyl-α-haloacetate which is useful in preparing 2-acetamidoethyl (3-trifluoromethylphenoxy) (4-chlorophenyl)acetate. The process comprises treating 4-chlorophenyl-α-haloacetonitrile with 2-acetamidoethanol in the presence of an acid to form an imino intermediate which is then hydrolyzed to afford the intermediate 2-acetamidoethyl 4-chlorophenyl-α-haloacetate. This intermediate may be treated with 3-trifluoromethylphenol in the presence of a base, to afford 2-acetamidoethyl (3-trifluoromethylphenoxy) (4-chlorophenyl)acetate, a hypocholesterolemic and hypolipemic agent which effectively reduces the concentration of cholesterol, triglycerides and other lipids in blood serum.

---

This invention relates to a novel method for the preparation of 2-acetamidoethyl (4-chlorophenyl)-α-haloacetate which is useful in preparing 2-acetamidoethyl (3-trifluoromethylphenoxy) (4-chlorophenyl)acetate.

There is no clear agreement about the actual role of cholesterol and triglycerides in the localization of atherosclerotic plaques but numerous studies support the concept that cholesterol and triglycerides play a major role in the pathogenesis of atherosclerosis because along with other lipids and fibrin they accumulate in the arterial intima and subintima and produce arterial corrosion.

It is the purpose of this invention to describe a novel method for the preparation of 2-acetamidoethyl (4-chlorophenyl)-α-haloacetate useful in the preparation of 2-acetamidoethyl (3-trifluoromethylphenoxy) (4-chlorophenyl)acetate which product has proved effective in reducing the concentration of cholesterol, triglycerides and other lipids in blood serum. This compound induces a significant reduction in cholesterol and triglyceride levels in serum and it achieves this result with little or no irritation to the gastrointestinal tract.

This invention relates to a new process for preparing 2-acetamidoethyl (4-chlorophenyl)-α-haloacetate. This process employs as its starting material the readily available 4-chlorophenylacetonitrile (IV) which is converted to the 4-chlorophenyl-α-haloacetonitrile (III) by halogenation followed by treatment with 2-acetamidoethanol in the presence of an acid to form a 2-acetamidoethyl 4-chlorophenyl-α-haloacetimidate intermediate (II) which does not have to be isolated, followed by treatment with an aqueous solution to afford the desired intermediate 2-acetamidoethyl 4-chlorophenyl-α-haloacetate (I). The following equation illustrates this improved procedure:

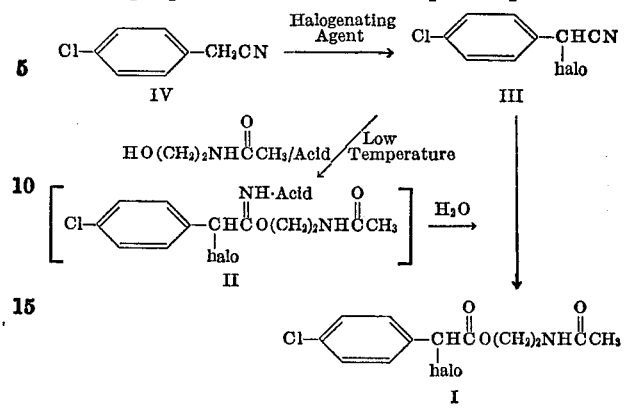

wherein the halo is chloro or bromo.

In the foregoing flowsheet the starting compound 4-chlorophenylacetonitrile (IV), a commercially available starting material, is heated at a temperature above its melting point, preferably at a temperature in the range of from about 80° to about 100° C. and then treated with a halogenating agent such as bromine or chlorine. It has been found desirable to add trace amounts of 48% hydrobromic acid as a catalyst when bromine is employed. This procedure eliminates the necessity for employing any solvents. The 4-chlorophenyl-α-haloacetonitrile (III) is then treated with 2-acetamidoethanol in the presence of an acid, such as hydrogen chloride, p-toluenesulfonic acid, boron trifluoride and the like to form 2-acetamidoethyl 4-chlorophenyl-α-haloacetimidate hydrochloride (II). The preferred acid is hydrogen chloride. This is the first known instance of an α,α-disubstituted nitrile (III) affording a stable imino ester acid addition salt (II) in situ. The literature discloses that imino esters normally decompose to form an amide and an alkyl halide. The stability of the imino ester (II) is attributable to the use of a low temperature in the range of from about −20° to about +10° C. and, preferably, at about −10° C. and to the use of an acid other than hydrogen bromide. The imino ester (II) is then treated with an aqueous solution to afford the desired intermediate 2 - acetamidoethyl 4 - chlorophenyl-α-haloacetate (I).

The 2-acetamidoethyl (4-chlorophenyl)-α-haloacetate, upon treatment with 3-trifluoromethylphenol in the presence of a base, affords the 2-acetamidoethyl (3-trifluoromethylphenoxy) (4-chlorophenyl)acetate. Bases which may be employed include an alkali metal or alkaline earth metal base such as potassium carbonate, calcium carbonate, sodium bicarbonate, potassium bicarbonate, sodium hydroxide, potassium hydroxide and the like. The choice of solvents is not critical to this step of the reaction and, in general, this step may be conducted in any suitably inert solvent such as tetrahydrofuran, methylene chloride or hydrocarbons of the aliphatic, acyclic and aromatic variety such as pentane, hexane, decane, benzene and the like. In general, metallic bicarbonates and carbonates are the preferred bases and aprotic solvents are also preferred to protic solvents. The process may be conducted at ambient temperature but, in practice, the reaction is facilitated by employing temperatures in the range of from about 40° C. up to the reflux temperature of the reaction mixture over a period of time of from about one to twenty hours.

The following examples illustrate the process of this invention. However, the examples are illustrative only and this invention should not be construed as being limited thereto since other reaction conditions and other functionally equivalent reagents may be substituted to afford the identical 2-acetamidoethyl (4-chlorophenyl)-α-haloacetate.

EXAMPLE 1

2-Acetamidoethyl (4-chlorophenyl)-α-bromoacetate

Step A: 4-Chlorophenyl-α-bromoacetonitrile.—4-Chlorophenylacetonitrile (303.2 g., 2.0 mole) is heated to 90° C. on a steam bath and 48% hydrobromic acid (5 drops) is added. Bromine (336 g., 2.1 mole) is then added dropwise to the stirred melt over a one-hour period at 90°–95° C. The reaction mixture is heated an additional 15 minutes and then cooled. Benzene (300 ml.) is then added and 100 ml. of the benezene is removed by distillation at 80° C. The solution is cooled, filtered and the benzene removed to afford 435.5 g. of crude product which is extracted with 3 liters of hexane at 50°–55° C. Isopropanol (100 ml.) is added to the hexane solution which is then cooled to 25° C. The product is collected by filtration to afford 235.2 g. (51% yield) of 4-chlorophenyl-α-bromoacetonitrile, m.p. 46°–49° C.

Step B: 2-Acetamidoethyl (4-chlorophenyl)-α-bromoacetate.—To a solution of 4-chlorophenyl-α-bromoacetonitrile (24.0 g., 0.104 mole) and 2-acetamidoethanol (20.6 g., 0.2 mole) in anhydrous dimethylformamide (6 ml.) and methylene chloride (18 ml.) is added hydrogen chloride (21.7 g., 0.595 mole) at 0° to 10° C. over a 45-minute period. The reaction mixture is stirred for four hours at 0° C. to afford 2-acetamidoethyl 4-chlorophenyl-α-bromoacetimidate hydrochloride. Methylene chloride (50 ml.) is added to the reaction mixture followed by the addition of water (50 ml.) at 5° to 15° C. Additional methylene chloride (100 ml.) and water (100 ml.) are then added. The aqueous layer is discarded and the organic layer is washed consecutively with a sodium chloride solution (100 ml.), a saturated sodium bicarbonate solution (100 ml.) and then dried over sodium sulfate. The solution is filtered and the methylene chloride removed under vacuum to afford 28.7 g. (82% yield) of crude 2-acetamidoethyl 4-chlorophenyl-α-bromoacetate as a viscous orange oil which is used without further purification in the next step.

Elemental analysis for $C_{12}H_{13}BrClNO_3$:
Calc.: Br, 23.9; Cl, 10.6;
Found: Br, 24.5; Cl, 12.3.

EXAMPLE 2

2-Acetamidoethyl (3-trifluoromethylphenoxy) (4-chlorophenyl)acetate

2-Acetamidoethyl 4-chlorophenyl-α-bromoacetate (3.34 g., 0.01 mole) is refluxed in benzene (20 ml.) for three hours with anhydrous potassium carbonate (2.76 g., 0.02 mole) and 3-trifluoromethylphenol (1.62 g., 0.01 mole). Benzene (20 ml.) and water (50 ml.) are then added to the reaction mixture and the aqueous layer discarded. The benzene solution is washed with a 5% sodium chloride solution (50 ml.) and then dried over sodium sulfate. The solution is filtered and the benzene removed under vacuum to afford 3.8 g. of crude product. The crude product is dissolved in benzene (15 ml.) to which is added petroleum ether (15 ml.). This mixture is stirred for five minutes during crystallization. Additional petroleum ether (60 ml.) is slowly added with stirring over a one-hour period and the slurry is then stirred an additional hour. The product is collected and dried to afford 2.7 g. (65% yield) of 2-acetamidoethyl (3-trifluoromethylphenoxy) (4-chlorophenyl)acetate, m.p. 89°–91° C. Further recrystallization from isopropanol affords the product having a melting point of 93.5°–95.5° C.

I claim:

1. A process for preparing 2-acetamidoethyl 4-chlorophenyl-α-haloacetate which comprises treating a 2-acetamidoethyl 4-chlorophenyl-α-haloacetimidate acid addition salt with an aqueous solution to afford 2-acetamidoethyl 4-chlorophenyl-α-haloacetate.

2. A process for preparing 2-acetamidoethlyl 4-chlorophenyl-α-haloacetate which comprises treating 4-chlorophenyl-α-haloacetonitrile with 2-acetamidoethanol in the presence of an acid at a temperature in the range of from about —20° C. to about +10° C. followed by treating the 2-acetamidoethyl 4-chlorophenyl-α-haloacetimidate acid addition salt obtained with an aqueous solution.

3. The process of Claim 2 wherein the acid is hydrogen chloride, p-toluenesulfonic acid or boron trifluoride.

4. The process of Claim 2 wherein the acid is hydrogen chloride.

5. A process for preparing 2-acetamidoethyl 4-chlorophenyl-α-haloacetate which comprises treating 4-chlorophenylacetonitrile with a halogenating agent, treating the 4-chlorophenyl-α-haloacetonitrile obtained with 2-acetamidoethanol in the presence of an acid at a temperature in the range of from about —20° C. to about +10° C., and then treating the 2-acetamidoethyl 4-chlorophenyl-α-haloacetimidate acid addition salt with an aqueous solution.

6. A process according to Claim 5 for preparing 2-acetamidoethyl 4-chlorophenyl-α-bromoacetate with comprises treating 4-chlorophenylacetonitrile with bromine followed by treating the 4-chlorophenyl-α-bromoacetonitrile obtained with 2-acetamidoethanol in the presence of hydrogen chloride at 0° to 10° C. and then treating the 2-acetamidoethyl 4-chlorophenyl-α-bromoacetimidate hydrochloride with an aqueous solution.

7. A compound of the formula:

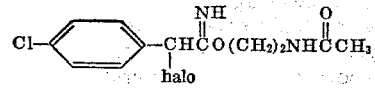

and its acid addition salts wherein halo is chloro or bromo.

8. A compound according to Claim 7 wherein the halo is bromo.

9. A compound according to Claim 7 wherein the product is 2-acetamidoethyl 4-chlorophenyl-α-bromoacetimidate hydrochloride.

References Cited

Ueda et al., Index Chemicus 33, 110978 (1969).

LORRAINE A. WEINBERGER, Primary Examiner

P. J. KILLOS, Assistant Examiner

U.S. Cl. X.R.

260—465 G, 473 G, 477; 424—309